June 2, 1953   A. F. MYERS   2,640,336
TORQUE TRANSMITTING CONNECTION
Filed April 21, 1949

INVENTOR.
Albert F. Myers.
BY
Cameron, Kerkam & Sutton
Attorneys.

Patented June 2, 1953

2,640,336

UNITED STATES PATENT OFFICE 2,640,336

TORQUE TRANSMITTING CONNECTION

Albert F. Myers, Berkley, Mich., assignor to Patent Developers, Inc., Detroit, Mich., a corporation of Michigan Application April 21, 1949, Serial No. 88,782

3 Claims. (Cl. 64—23)

The present invention relates to a device for transmitting torque between two rotating devices. As herein shown one end of the connection is at a universal joint in a gear case and the other end is at a ring gear on a driven axle.

One of the objects of the invention is to provide extensibility in the connection so that there will always be sufficient spline engagement as the axles articulate and the pinion adapter slides into and out of the universal joint or other rotary member.

A further object is to provide a construction which will keep the pinion in proper thrustwise position or mesh with the ring gear and transmit any thrust resulting therefrom to the bearing that supports the pinion shaft, and thence to the axle housing.

Another object is to provide a construction that avoids the necessity for close machining tolerances in regard to parallelism of the threaded end and spline portions of the pinion shaft and at the same time does not subject the threads to bending or high tension or torsion stresses during assembly of the components.

Figure 1:
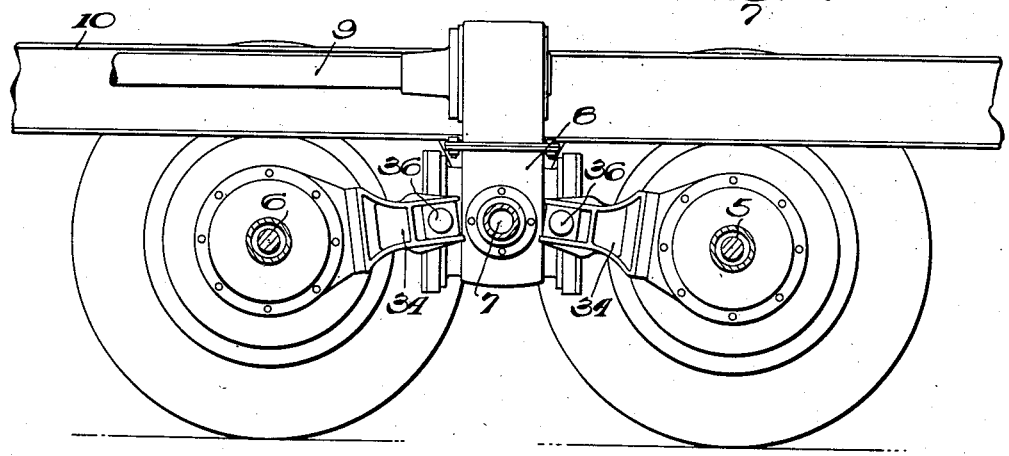
Figure 2:
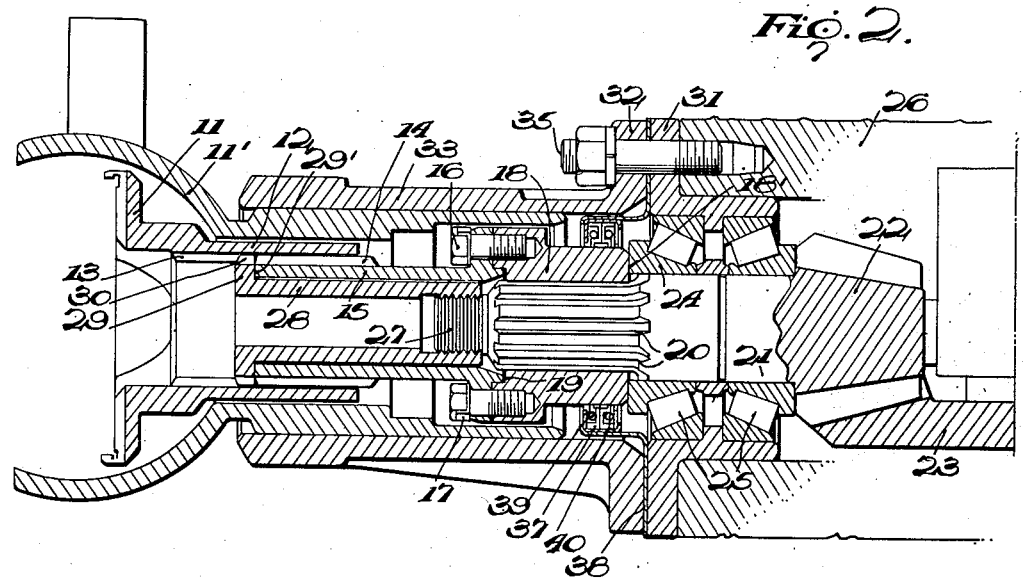

The invention will be better understood by reference to the accompanying drawing, illustrating one embodiment of the inventive idea, and wherein:

Fig. 1 is a side view in elevation of a bogie to which my improvement is applicable; and Fig. 2 is a plan view, partly in section, showing the connections between a universal joint and a ring gear mounted on a driven axle.

Referring to the drawings 5 and 6 are driven axles and 7 is one of a pair of trunnions to which any suitable spring system (not shown) is connected. A gear case 8 is connected to trunnions 7, and 9 is the propeller shaft extending from the engine carried by the frame 10.

The gear case 8 carries the usual universal joints part of one of which is shown at 11, enclosed by ball 11' and provided with an extension 12 having internal splines 13. These splines 13 engage splines 14 on an adapter member 15 which member has torque transmitting connections, such as bolts 16 and locks 17, with adapter sleeve 18. The adapter member 15 pilots at 19 on the adapter sleeve 18.

The adapter sleeve 18 is splined internally and engages splines 20 on shaft 21 thus rotating the shaft and also pinion 22 on the end thereof, which pinion meshes with and drives ring gear 23 one on each axle 5 and 6. Pinion shaft 21 is mounted in a bearing 24 provided with tapered roller bearings 25, said bearing being carried by the differential housing 26 of the axles 5 and 6. Adapter sleeve 18 contacts bearing 24 at 18'.

The inner end of shaft 21 is screw threaded at 27 and a hollow tubular extension 28 is screwed thereon. This extension 28 is provided with a flange 29 having splines 30 that engage the internal splines 13 to prevent extension 28 from rotating on screw threads 27. Flange 29 bears against the end of adapter member 15 at 29'. Accordingly any inward movement of pinion 22 or tendency of the pinion 22 to move toward the axle 5 or 6 is resisted and the thrust is transmitted from pinion 22, shaft 21, threaded extension 28, flange 29, adapter member 15, adapter sleeve 18, and bearing 24, through bearing cage 31, to the differential housing 26.

Bearing cage 31 of the axle differential housing 26 and the base or flange portion 32 of the torque-resisting members 33, 34 (as shown in Van Husen No. 2,116,485 and Baker No. 2,235,351) are connected by bolts 35. The axis of each of trunnions 36 (Fig. 1) of the torque-resisting members passes transversely of the vehicle substantially through the center of the universal joint 11.

An oil seal 37 is carried by a metal retainer 38 clamped between flanges 31 and 32, and seals against the hub of the adapter sleeve 18 under pressure from springs 39 and 40.

It is particularly noted that the present invention provides, among other things, the extension 28 secured to pinion shaft 21 by screw threads 27 adjacent the splines 20; and this construction eliminates the necessity for close machine tolerances in regard to the parallelism of the threaded end with respect to the splines on the pinion shaft, which close tolerances had to be observed heretofore when the adapter member 15 was directly screwed on shaft 21 at screw threads 27.

Further the life factor of the present construction is much greater than that of constructions heretofore employed because it does not place any bending or fatigue load on the threaded end 27; and it is not necessary as heretofore to subject the threads 27 to undue stresses when tightening adapter flange 15 up against adapter sleeve 18 in order to properly align these parts so that the torque transmitting screws 16 can be installed.

The scope of the invention is defined in the appended claims.

What is claimed is:

1. An extensible torque transmitting connection between a rotatable splined driving member and a shaft having a splined section and mounted in a bearing, comprising an extension having a threaded connection to the end of said shaft adjacent said driving member and provided with a flange having splines engaging the splines on said rotatable driving member to prevent rotation of said extension relative to said shaft; an adapter sleeve engaging the splined section of said shaft and contacting said bearing; a separate adapter member splined to said driving member; and torque transmitting connections between said adapter member and adapter sleeve; the flange on said extension contacting the free end of said adapter member.

2. The combination of claim 1 in which the extension and the adapter member are tubular and are assembled one within the other.

3. The combination of claim 1 in which bolts are the torque transmitting connections between the adapter sleeve and adapter member.

ALBERT F. MYERS.

References Cited in the file of this patent

UNITED STATES PATENTS

| Number | Name | Date |
| --- | --- | --- |
| 2,037,206 | Boden | Apr. 14, 1936 |